April 28, 1936.　　　F. H. OWENS　　　2,039,108

ENDLESS FILM MAGAZINE

Filed Oct. 5, 1932　　　2 Sheets-Sheet 1

INVENTOR
Freeman H. Owens
BY
ATTORNEYS

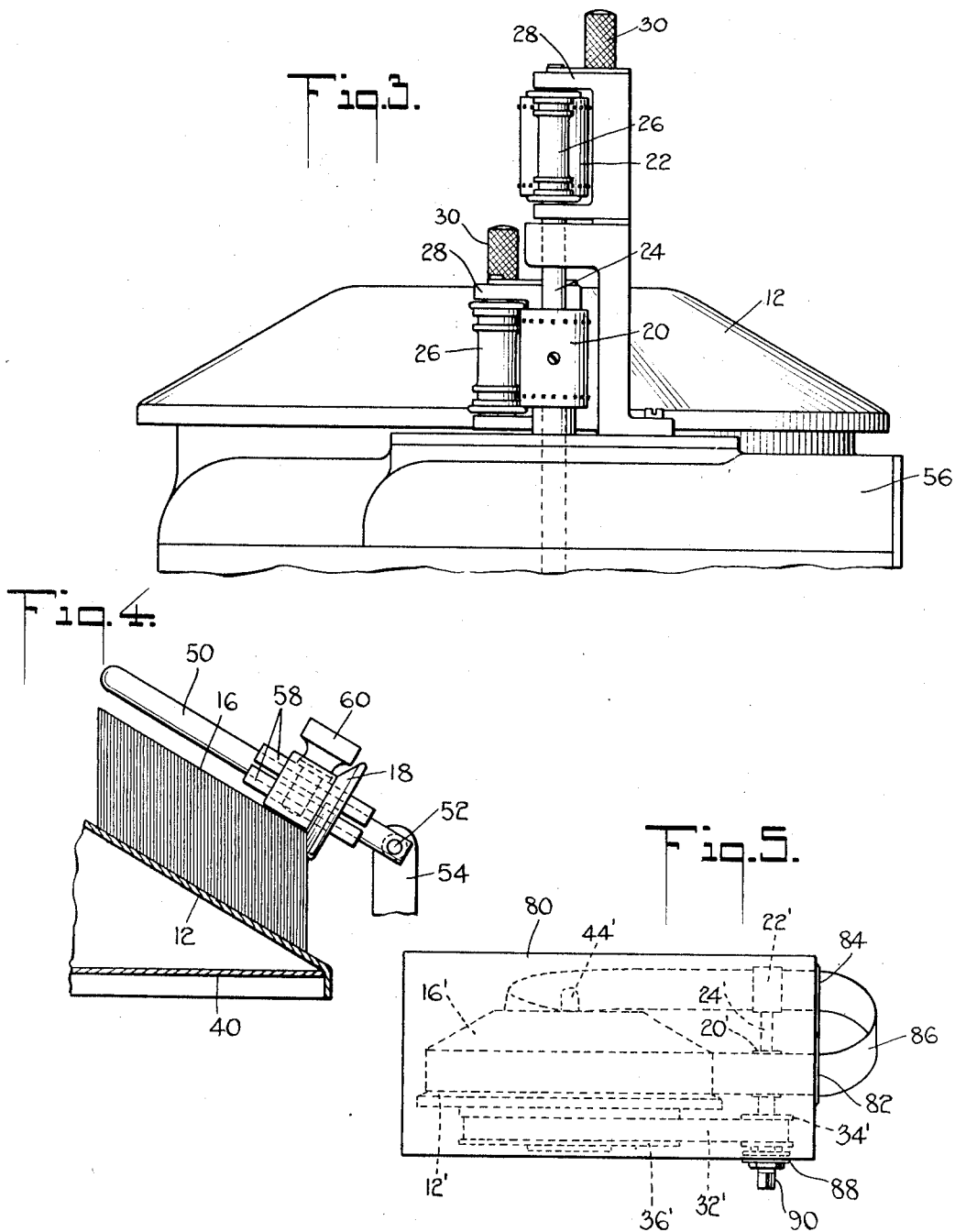

Patented Apr. 28, 1936

2,039,108

UNITED STATES PATENT OFFICE 2,039,108

ENDLESS FILM MAGAZINE

Freeman H. Owens, New York, N. Y.

Application October 5, 1932, Serial No. 636,276

14 Claims. (Cl. 88—18.7)

This invention relates to film magazines, as for motion picture or/and sound reproducing systems, and more particularly to such a magazine arranged to handle a continuous or endless reel of film.

Endless film magazines are known and have been experimented with for a great many years but such magazines have, so far as I am aware, never attained any popularity because they are not smooth, frictionless, and dependable in operation. The primary and general object of the present invention resides in the provision of a new and improved endless film magazine which will carry an endless reel of film and permit the film to be fed to and withdrawn from the reel smoothly, readily, and without friction between or binding and jamming of the convolutions of film.

More particularly objects of the present invention are to so design the magazine that it will accommodate different sizes of film reel, and to further design the magazine so that such different sizes of film reel may, if desired, be kept at their normal outside diameter for packing and shipment. Still another object of the invention is to provide means for feeding and positively determining the rate of feed of the film to and from the magazine; and a further object of the invention is to so devise the said means that the film will not be twisted or distorted between the reel and the film feeding means. Still another object of the invention resides in the provision of means for lightly frictionally driving the film reel or magazine at a rate approximately commensurate to the rate of positive feed of the film caused by the aforesaid film feeding means.

The endless film magazine as so far described is valuable for picture projection, as in the case of continuous picture projectors used in show windows or for other advertising purposes, but a more particular object of the present invention centers about the application of the endless film magazine to sound reproduction obtained from a plurality of collateral sound tracks disposed on a single film. For this purpose the present arrangement possesses a number of advantages because if continual sound reproduction is desired the several sound tracks may be successively reproduced one after the other without interrupting the continuous movement of the film, and even if the tracks are to be separately reproduced the endless film magazine makes possible an optional selection of any one of the several sound tracks.

Still another object of the present invention resides in the provision of a light-proof endless film magazine adapted for camera exposure of unexposed film, such an arrangement being valuable when it is desired to record lengthy sound programs, as, for example, at a broadcasting studio.

To the accomplishment of the foregoing and such other objects as will hereinafter appear, my invention consists in the endless film magazine and related mechanisms as well as the elements thereof and their relation one to the other, as hereinafter are more particularly described in the specification and sought to be defined in the claims. The specification is accompanied by drawings, in which:

Fig. 3 is an end elevation;

Fig. 4 is a detail of the guide rollers for supporting the film; and

Fig. 5 is a side elevation of an enclosed magazine adapted for camera purposes.

Figure 1:
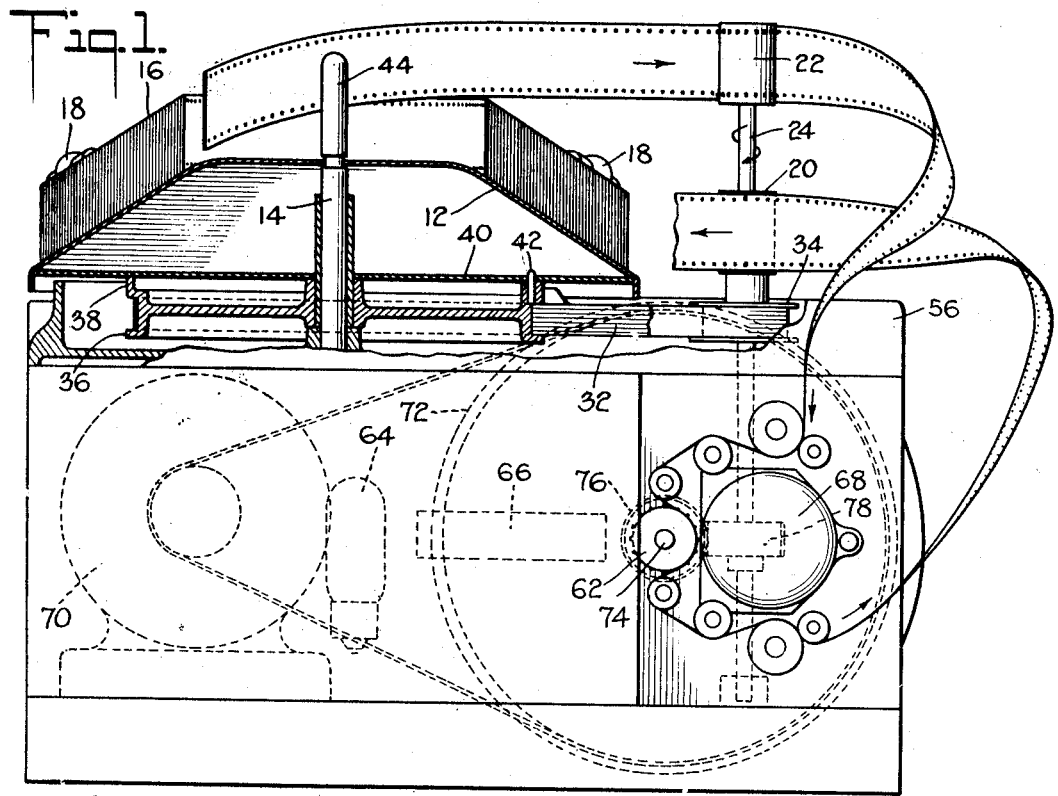
Fig. 1 is a partially sectioned side elevation of my endless film magazine as applied to a sound reproducing system.

Referring to the drawings and more particularly to Figs. 1–4 thereof, the endless film magazine of my invention comprises an upwardly dished support plate or disc 12 rotatably mounted on a vertical shaft 14. An endless reel of film 16 is laid upon support disc 12 and rests upon the upwardly dished or conical portion thereof. No walls need be provided around the magazine or on the disc 12, but instead the reel of film 16 may be supported by guide rollers 18 best shown in Figs. 2 and 4.

The film is fed into the magazine at the outer periphery of disc 12, that is, to the outside of reel 16, and is withdrawn from the magazine near the center of disc 12, that is, from the inside of reel 16. Positive feed means are preferably provided to feed the film into and withdraw the film from the reel 16. This means preferably comprises a pair of sprockets 20 and 22 mounted on a vertical shaft 24, the entrant and exit strands of film being meshed with opposite sides of the sprockets 20 and 22 by an appropriate system of pad rollers 26 and 28. The pad rollers may be provided with handles 30 for moving the rollers away from the sprockets when threading up a new reel of film. The pad rollers have been omitted from Fig. 1 in order not to complicate the drawings, and are best shown in Figs. 2 and 3. Similarly, the guide rollers 18 have been omitted from Fig. 3.

The support disc 12 is preferably rotated under a slip or light friction drive at a speed approximately proportionate to but preferably somewhat in excess of the rate of feed of film from the disc by the feed sprocket 22. In the present case this means is exemplified by a belt 32 extending between a driving pulley 34, on sprocket shaft 24, and a driven pulley 36 on the magazine shaft 14. In the present design the driven pulley 36 is further provided with an upwardly extending peripheral flange 38 which acts as a support for the lower face disc 40 of the conical or dished disc 12. The pulley 36 is further provided with one or more dowel pins 42 insuring positive rotation of the magazine disc with the pulley, and yet permitting free removal or disassembly of the disc from the shaft 14. This shaft 14, it should be observed, is preferably provided with an upward projection or extension 44 which acts as a guide against which the strand of film leaving the reel may bear should it tend to be drawn too far to one side.

The operation of this film magazine is peculiarly and unexpectedly satisfactory, particularly to those versed in the art who have had experience of prior forms of endless film magazines, for in the present magazine the film is fed into and withdrawn from the reel smoothly, readily, and not only without binding or jamming of the convolutions of film, but without even noticeable friction. While I do not wish to be bound by any theory of operation advanced herein, a probable explanation of the satisfactory operation of the device is that the conical or dished surface of support disc 12 tends to cause a spreading of the convolutions of film outwardly toward the periphery of the disc, and this outward component of the force of gravitation counter-balances any tendency of the convolutions of film to tighten or reduce in diameter at the center of the disc such as might be expected from a theoretical consideration of the smaller diameter of the rotating disc at its center compared to the larger diameter at its periphery. In other words, if the support disc 12 were perfectly flat the difference in diameter at the inner and outer ends of the reel would result in the many convolutions of film becoming tightened or jammed together as the film is cumulatively withdrawn from the reel at a speed equal to the rate of feed of film into the reel. This tendency is counteracted in the present magazine apparently by reason of the downward taper or conical shape of the support. In fact, a certain spread or spacing or relief of friction between the convolutions of film takes place, resulting in a gratifying smoothness of operation and a reduction in abrasion and wear of the surface of the film.

As before stated, friction drive of the disc is employed, and the rate of drive is desirably made approximately equal to the rate of withdrawal of film from the disc, rather than the rate of feed of film into the disc. This relation is readily observable from an inspection of the approximate ratio of diameters of the pulley arrangement shown in the drawings. However, the ratio is not all critical and may be varied if desired. The specified arrangement results in a tendency for the film to climb upwardly of the dished disc and to be discharged at the top of the disc, there being no binding between convolutions of the film because the dished disc actually tends to space apart the successive convolutions of film. The tendency of the rotating disc is to push the film upwardly of the disc and to force it out of the reel at the exit end, so that the rotating disc will practically take care of itself as regards both the reeling and simultaneous unreeling of a continuous film. Slippage takes place between the film reel and the disc, and it is therefore not essential that the drive of the disc be itself a frictional drive, for a positive drive may be employed.

By nicely balancing the opposed forces acting on the film it is theoretically possible to dispense with the guide rollers 18. However, these are preferably employed in order to make the retention and control of the film positive. At the same time it is preferable that the guide rollers be adjustable radially of the conical disc so that different sizes of film reel may be kept in normal dimension instead of being expanded or spread outwardly to the full diameter of the disc. In the present case four pairs of guide rollers are used, the pairs being arranged at diametrical opposed points, as is clearly evident from an inspection of Fig. 2 of the drawings. Each of the flanged guide rollers 18 is freely rotatable on and reciprocable along a smooth spindle 50, the outer end of each spindle 50 being secured to a transverse pin 52 extending between the two spindles of each pair. The pins 52 are carried by upstanding pedestals 54 secured as by being cast integrally with the base 56 of the magazine. A pair of clamp plates 58 extend between the spindles 50 and are locked together by an appropriate thumb screw 60. The ends of the plates 58 are bifurcated and encompass the guide rollers 18. The altitude of the pedestals 54 is preferably made such that when the guide rollers 18 are brought into contact with the film reel 16 the spindles 50 extend parallel to the conical surface of the disc 12, as is best shown in Fig. 4 of the drawings. The spindles 50 also extend substantially radially of disc 12, as is evident from Fig. 2 of the drawings.

With the arrangement shown, the spindles 50 and guide rollers 18 may be oscillated upwardly and outwardly away from the disc in order to facilitate the removal or replacement of a reel of film on the disc 12. After a reel has been laid upon the disc it is then simply necessary to drop the four guide roller assemblies back into position. To accommodate a substantial change in diameter of the film reel it is merely necessary to loosen the thumb screws 60 and slide the plates 58 and with them the guide rollers 18 axially of spindles 50, the thumb screws then being tightened to fix the new position of the guide rollers. It should be understood that it is not essential to change the position of the guide rollers because a small reel of film may be permitted to expand outwardly to a larger dimension. The adjustability here specified is intended merely to keep the reel of film in substantially its standard dimension.

The endless film magazine here described is useful in any apparatus involving an endless film, as, for example, the continuous display of advertising motion pictures in show windows or the like. It is here illustrated in combination with sound reproducing apparatus, the film being provided with a plurality of sound tracks in collateral relation, thereby making possible an exceedingly large amount of entertainment from a single reel of film. The general idea is disclosed in my prior application Serial No. 349,983, filed March 26, 1929, in which, however, the film is wound on separate supply and take-up reels. To avoid rewinding, alternate sound tracks are recorded in opposite directions. The present arrangement is better because all of the sound tracks may be recorded in the same direction, and any sound track may be optionally selected at any time without giving thought to which direction the film is to be run, for the film always operates in but one direction.

Figure 2:
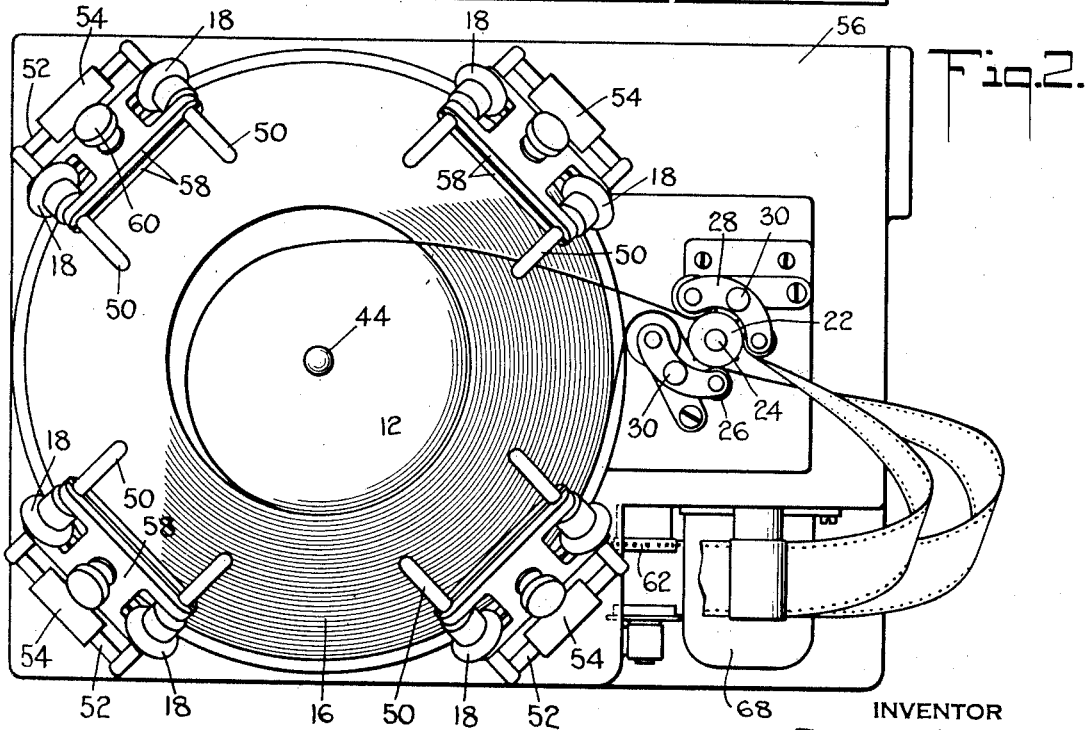
Fig. 2 is a plan view thereof.

Referring to Fig. 1 it will be observed that the film withdrawn from the magazine is passed over appropriate guide rollers bringing the same into engagement with feed sprockets including the central sprocket 62, the entire arrangement serving to move the film between an illumination system and a light-sensitive device. The illumination system preferably comprises a lamp 64 and an optical system 66 which may include the conventional lens and slit arrangement for focusing a beam of light on one of the sound tracks on the film. On the opposite side of the film a photo-electric cell is provided within a housing 68. The illumination system is preferably provided with means, not shown, permitting the light beam to be selectively moved to one or another of the sound tracks on the film. This apparatus may be of the type described in my prior application above referred to, or in my Patents 1,735,335 or 1,791,039, or may take the form shown in my co-pending application Ser. No. 661,901, filed March 21, 1933.

The entire apparatus is driven by a motor 70 belted to a pulley 72 mounted on a shaft 74 carrying the sprocket 62. This shaft further includes a helical gear 76 meshing with a helical gear 78 mounted on the vertical sprocket shaft 24 already described. Shaft 24 may be geared to other sprockets by similar pairs of helical gears. Thus a positive gear relation is established between the film feeding means 62 and the magazine film feeding sprockets 20 and 22. For simplicity all sprockets are preferably equal in size and are rotated at equal speeds.

The present invention may also be applied for camera purposes. Thus a reel of unexposed film may have recorded thereon a lengthly sound program, for example, the program of a radio broadcasting station. For this purpose the sound reproducing arrangement illustrated in Fig. 1 will instead be replaced by an enclosed camera arranged to expose a series of sound tracks on the film. For convenient daylight handling of the unexposed film it is preferably kept within a light-tight housing, and such an arrangement may be described in connection with Fig. 5 of the drawings. Referring to the said figure, the film magazine is housed within a light-tight housing 80, and comprises an upwardly dished or conical disc 12' corresponding to the disc 12 already described. This disc is mounted on a vertical shaft 44' and carries a reel of unexposed film 16'. The disc is driven by a pulley 36' belted through a belt 32' to a driving pulley 34' mounted on a vertical sprocket shaft 24'. Shaft 24' is provided with a pair of sprockets 20' and 22' for feeding the film into and withdrawing the film from the reel 16'. The enclosure 80 is provided with slits at the points 82 and 84 adjacent the sprockets 20' and 22' for the entrance and discharge of film, respectively. A loop 86 of the continuous film extends out of the film magazine 80 and may be threaded on appropriate guide and feed mechanism within the camera. The shaft 24' projects out of the magazine through a light-tight coupling 88 with an appropriately squared or keyed end 90 adapted to mesh with mating means on the drive mechanism of the camera, so that the rate of film feed in the magazine and in the camera will be properly synchronized. It will be understood that the showing in Fig. 5 is relatively schematic, the guide rollers 18 and the pad rollers 26 and 28 being omitted for the sake of simplicity. It will further be understood that the magazine container 80 is itself provided with an openable cover giving access to the interior of the magazine and exposing at least one end of the slit system, so that the magazine may be loaded in a conventional dark room.

When using the same for recording the program of a broadcasting station, the film reel may be sufficient for, say, fifteen minutes of recording, in which case the exposed loop of film 86 will be located at fifteen minute intervals corresponding to the interruption of the program for station identification. Successive fifteen minute periods may be recorded simply by shifting the recording to a succeeding sound track.

It is believed that the mode of constructing and using my invention as well as the many advantages thereof will, for the most part, be apparent from the foregoing detailed description thereof. The film reel is readily loaded or unloaded from the rotatable disc. It may be kept substantially at its original diameter. In any case the film is fed into and withdrawn from the reel smoothly and without binding or jamming or even appreciable friction. The film is drawn into the reel by the preferably excessive rotation of the disc, and tends to rise up the conical disc and to be discharged freely from the same. This tendency to rise up the disc releases friction between the coils and yet does not result in an actual displacement or tightening or jamming of the reel because the tendency is counteracted by a gravitational force acting to drive the film downwardly on the disc. The rate of film feed into and out of the reel may be made positive by the use of sprocket mechanism, and this mechanism is so disposed that the film is not twisted or distorted between the reel and the sprocket mechanism. The mechanism required is relatively simple and inexpensive. It may be made even more inexpensive by replacing the guide rollers and associated mechanism with a simple fixed arcuate wall or band of metal, forming a smooth fence or support against which the outermost loop of film may slide, particularly at the side into which the film is fed. The general arrangement may be adapted for camera purposes and arranged for daylight loading. In such case the camera is enclosed and houses a magazine which is itself enclosed. If daylight loading is not desired, the disc may be enclosed solely by the camera, instead of by both the camera and a magazine casing.

It will be apparent that while I have shown and described my invention in preferred forms, many changes and modifications may be made in the structures disclosed without departing from the spirit of the invention, defined in the following claims.

I claim:

1. An endless film magazine comprising an upwardly dished support disc rotatably mounted on a vertical shaft, the upwardly dished portion of said disc constituting the entire film supporting surface of the disc, means to feed film into the magazine at the outer periphery of the disc, means to withdraw film from the magazine at the center portion of the disc, means to locate the film on the upwardly dished portion of the disc, and means to rotate the disc at a speed commensurate with the rate of discharge but substantially exceeding the rate of supply of film to the disc.

2. An endless film magazine comprising an upwardly dished generally horizontal disc rotatably mounted on a vertical shaft, means to support a reel of film wholly on the upwardly dished portion of said disc including flanged guide rollers mounted for rotation at the outer periphery of the reel on axes extending generally radially of the dished disc, means to feed the film into the magazine at the periphery of the disc, and means to withdraw the film from the magazine near the center of the disc.

3. An endless film magazine comprising an upwardly dished generally horizontal disc rotatably mounted on a vertical shaft, means to support a reel of film on said disc including guide rollers mounted for rotation at the outside of the reel on axes extending generally radially of the dished disc, said guide rollers being provided with means for adjusting the same radially of the disc in order to accommodate reels of film or widely different diameter, means to feed the film into the magazine at the periphery of the disc, and means to withdraw the film from the magazine near the center of the disc.

4. An endless film magazine comprising an upwardly dished generally horizontal circular base plate or disc rotatably mounted on a vertical shaft, means to support a reel of film on said disc including spaced pairs of guide rollers mounted for free rotation on shafts extending generally radially of and parallel to the face of the dished disc, said guide rollers being provided with means for adjusting the same radially of the disc in order to accommodate reels of film of widely different diameter, means to feed the film into the magazine at the periphery of the disc, and means to withdraw the film from the magazine near the center of the disc.

5. An endless film magazine comprising a generally horizontal upwardly dished support disc rotatably mounted on a vertical shaft, the upwardly dished portion of said disc constituting the entire film supporting surface of the disc, means to support a reel of film with its outermost convolution on the upwardly dished portion of the disc, means to feed film into said magazine at the outer periphery of the disc and to withdraw film from the center portion of the disc, said shaft being projected vertically upward above the disc in order to provide a central guide for the film withdrawn from the magazine.

6. An endless film magazine comprising a generally horizontal upwardly dished support disc rotatably mounted on a vertical shaft, means to feed film into said magazine at the outer periphery of the disc and to withdraw film from the center portion of the disc comprising sprockets mounted on a vertical shaft at one side of the disc and pad rollers associated with said sprockets on opposite sides thereof in order to move the film passing therethrough in opposite directions, and means coupling said vertical sprocket shaft and said vertical disc shaft for providing a frictional drive of the rotatable disc.

7. An endless film magazine comprising a generally horizontal upwardly dished support disc rotatably mounted on a vertical shaft, means to feed film into said magazine at the outer periphery of the disc and to withdraw film from the center portion of the disc comprising sprockets mounted on a vertical shaft at one side of the disc and pad rollers associated with said sprockets on opposite sides thereof in order to move the film passing therethrough in opposite directions, said disc shaft being projected vertically upward above the disc in order to provide a central guide for the film withdrawn from the magazine, and means for rotating said vertical sprocket shaft and said vertical disc shaft.

8. An endless film sound reproducing system comprising an optical illumination system, a light-sensitive device, and means for moving the film therebetween in order to reproduce a sound track on the film, and an endless film magazine for said film, said magazine comprising a generally horizontal upwardly dished disc mounted on a vertical shaft, means to feed the film into the magazine at the periphery of said disc and to withdraw the film from the center of the magazine including a vertical shaft at one side of said disc provided with sprockets and mating pad rollers on opposite sides of said sprockets, friction drive means coupling said sprocket shaft and said magazine shaft in order to rotate said dished disc, and gear means positively interconnecting said sprocket shaft and the aforesaid film moving means of the sound reproducing system.

9. An endless film sound reproducing system comprising an optical illumination system, a light-sensitive device, and means for moving the film therebetween in order to reproduce a sound track on the film, and an endless film magazine for said film, said magazine comprising a generally horizontal upwardly dished disc mounted on a vertical shaft, means for supporting an endless reel of film on said disc including spaced flanged guide rollers freely rotatable on axes extending generally radially of the disc, means to feed the film into the magazine at the periphery of said disc and to withdraw the film from the center of the magazine including a vertical shaft at one side of said disc provided with sprockets and mating pad rollers on opposite sides of said sprockets, friction drive means between said sprocket shaft and said magazine shaft in order to rotate said dished disc, and gear means positively interconnecting said sprocket shaft and the aforesaid film moving means of the sound reproducing system.

10. An endless film magazine adapted for camera exposure of unexposed film comprising a light-proof magazine housing, a generally horizontal upwardly dished support disc rotatably mounted on a vertical shaft within said housing, means to feed film into the disc at the periphery of the disc and to withdraw film from the center portion of the disc comprising a vertical shaft at one side of the disc within said housing and carrying sprockets provided with mating pad rollers on opposite sides of said sprockets, said magazine being provided with film entrant and exit slits located adjacent said sprockets, and means frictionally interconnecting the sprocket shaft and the disc for rotating the disc.

11. An endless film magazine adapted to camera exposure of unexposed film comprising a light-proof magazine housing, a generally horizontal upwardly dished support disc rotatably mounted on a vertical shaft within said housing, means to support a reel of film wholly on the upwardly dished portion of said disc, means to feed film into the disc at the periphery of the disc and to withdraw film from the center of the disc, said magazine housing being provided with entrant and exit slits for the film, and means for rotating the disc.

12. An endless film magazine comprising an upwardly dished support disc rotatably mounted on a vertical shaft, means to rotate said upwardly dished disc, means to support a reel of film wholly on the upwardly dished portion of said disc, means to feed film into the magazine at the outer periphery of the disc, and means to withdraw film from the magazine at the center portion of the disc.

13. An endless film magazine comprising a frusto-conical upwardly dished support disc rotatably mounted on a vertical shaft, the sides of said disc sloping downwardly to the edge of the disc, means to rotate said disc, means to support a reel of film on said disc with the outermost convolution of said reel on the upwardly dished portion of the disc, means to feed film into the magazine at the outer periphery of the disc, and means to withdraw the film from the magazine at the center portion of the disc.

14. An endless film magazine comprising an upwardly dished support disc rotatably mounted on a vertical shaft, the upwardly dished portion of said disc constituting the entire film supporting surface of the disc, means to locate the film on the upwardly dished portion of the disc, means to feed film into the magazine at the outer periphery of the disc, and means to withdraw film from the magazine at the center portion of the disc.

FREEMAN H. OWENS.